UNITED STATES PATENT OFFICE.

JOHN NEEDHAM LONGDEN, OF NEW YORK, N. Y.

MARINE PAINT.

SPECIFICATION forming part of Letters Patent No. 446,818, dated February 17, 1891.

Application filed July 17, 1889. Serial No. 317,963. (No specimens.)

*To all whom it may concern:*

Be it known that I, JOHN NEEDHAM LONGDEN, a subject of the Queen of Great Britain, (having resided over two years in the United States and declared my intention to become a citizen,) now residing at No. 1300 Broadway, New York city, in the county of New York and State of New York, have invented certain new and useful Improvements in Marine Paints; and I do hereby declare that the following is a full, clear, and exact description of the invention, which will enable others skilled in the art to which it appertains to make and use the same.

Copper sheathings have long been known and used as outer coverings for the immersed surfaces of ships. They do not foul or only very slightly in seas where marine animal and vegetable life are most abundant.

Now my invention relates to the manufacture of a marine anti-fouling paint having chemically pure unoxidized metallic copper as its principal ingredient, and this metallic copper paint may be used to advantage in place of copper sheathings and at a great reduction in cost.

As copper when in a finely-divided dry condition oxidizes very rapidly in the presence of the atmosphere, and as it is of the first importance in this instance to prevent this oxidation and to incorporate the copper within a paint-vehicle in an unoxidized condition, I proceed as follows: I precipitate copper to a fine almost microscopic powder from a solution of a salt of that metal by any of the known reagents, such as metallic zinc. I then wash the precipitate in water to rid it of any acid contained. The precipitate is then passed through rollers or an expressing-machine, in which the major portion of the water is pressed out. A paint-vehicle is then made as follows: Place one hundred pounds of hard-stone asphaltum in a heated paint mixer and grinder. When melted, add one gallon of boiled linseed-oil, thoroughly mixing the two together. To this vehicle add about eight pounds of the pressed but still wet copper precipitate for every gallon of paint to be made. The temperature is then gradually brought up to about 400° Fahrenheit and maintained and run at that temperature until the last traces of water remaining in the copper precipitate are evaporated. This will be known when steam vapor has ceased to appear on the surface of the mixture. At this point the paint has attained a highly-concentrated condition, being freed of all moisture susceptible of evaporation. From the heated mixer and grinder the concentrated paint is placed in a cool mixer, where after cooling a known drier—benzine, naphtha, or turpentine—is added to thin the paint to the required consistency. The paint may then be canned or barreled for use.

By the operations stated it will be observed that the copper precipitate cannot become oxidized, because it never comes into direct naked contact with the atmosphere, each of the particles of which it is composed being inclosed in a watery film until its incorporation within a heated paint-vehicle, where all the moisture is driven off by evaporation, thus leaving the unoxidized copper with the whole of its well-known valuable poisonous properties preserved intact.

In using this copper paint on iron or steel ships or upon any metal marine structures the surface to be coated should be well cleaned, dried, and coated first with a good insulating non-galvanic paint to prevent the galvanic action, which would otherwise take place if the copper paint were brought into immediate contact with the iron or steel of the ship. Upon this insulating-paint when thoroughly dry the copper paint described is laid, the length of time between the dockings of ships using it determining the number of coats to be applied.

A good insulating-coat may be made of one hundred pounds of hard-stone asphaltum melted in a heated paint-mixer, to which add one gallon of boiled linseed-oil and a sufficient quantity of a dry pigment to give the required color and body, thoroughly mixing the three ingredients together.

The copper paint can be applied direct on wooden ships or on any wooden marine structure without an insulating-coat.

If properly laid on, the copper paint forms a continuous unbroken sheathing of metallic copper all round the ship, the thickness of this sheathing being in proportion to the number of coats applied and may be varied at will.

I do not claim any of the paint-vehicles, as they are quite numerous and well known; nor do I claim any of the insulating-paints, as those are equally numerous and well known; but What I do claim as my invention or improvement, and desire to secure by Letters Patent, is—

The process of manufacturing anti-fouling paint, which consists in incorporating moist precipitated copper with a paint-vehicle and stirring the mixture at a temperature sufficiently high to drive off the water, substantially as set forth.

Signed at New York, in the county of New York and State of New York, this 16th day of July, A. D. 1889.

JOHN NEEDHAM LONGDEN.

Witnesses:
E. J. HEMLEE,
CLARENCE LeK. KAIN,
E. R. McCARTY.